US012603515B2

(12) United States Patent
Zhou et al.

(10) Patent No.:     US 12,603,515 B2
(45) Date of Patent:      Apr. 14, 2026

(54) ACCESSORY CASE FOR MULTIPLE CHARGER TYPES

(71) Applicant: Apple Inc., Cupertino, CA (US)

(72) Inventors: Eric X Zhou, San Jose, CA (US);
Muhammad H. Kiani, Cupertino, CA
(US); Rohan Dayal, Daly City, CA
(US); Ye Li, Campbell, CA (US)

(73) Assignee: Apple Inc., Cupertino, CA (US)

( * ) Notice: Subject to any disclaimer, the term of this
patent is extended or adjusted under 35
U.S.C. 154(b) by 750 days.

(21) Appl. No.: 17/824,480

(22) Filed: May 25, 2022

(65) Prior Publication Data

US 2023/0080598 A1      Mar. 16, 2023

Related U.S. Application Data

(60) Provisional application No. 63/243,584, filed on Sep.
13, 2021.

(51) Int. Cl.
H02J 50/90          (2016.01)
H02J 7/00          (2006.01)
H02J 50/10          (2016.01)
H02J 50/70          (2016.01)

(52) U.S. Cl.
CPC ............ H02J 7/0044 (2013.01); H02J 50/10
(2016.02); H02J 50/70 (2016.02); H02J 50/90
(2016.02)

(58) Field of Classification Search
CPC ................................ H02J 7/0044; H02J 50/90
USPC ................................................. 320/108, 114
See application file for complete search history.

(56) References Cited

U.S. PATENT DOCUMENTS

| | | | |
|---|---|---|---|
| 3,177,403 A | 4/1965 | Baycura | |
| 9,793,761 B2 * | 10/2017 | Sampei | ................... H01F 38/14 |
| 10,742,050 B2 | 8/2020 | Rich et al. | |
| 2011/0109263 A1 * | 5/2011 | Sakoda | ................. B60L 53/122 |
| | | | 320/108 |
| 2012/0146576 A1 * | 6/2012 | Partovi | ................... H02J 50/12 |
| | | | 320/108 |

(Continued)

FOREIGN PATENT DOCUMENTS

| | | |
|---|---|---|
| DE | 102014012610 A1 | 6/2015 |
| DE | 112015003635 T5 | 4/2017 |

(Continued)

OTHER PUBLICATIONS

Korean Patent Application No. 10-2022-0109986 , "Office Action",
Jun. 25, 2024, 6 pages.

(Continued)

*Primary Examiner* — Ahmed H Omar
(74) *Attorney, Agent, or Firm* — Kilpatrick Townsend &
Stockton LLP

(57)     ABSTRACT

Accessory cases that can be charged using one or more types
of wireless chargers. An example can provide an accessory
case having a first alignment feature for aligning to a first
type of wireless charger. The first alignment feature can
include one or more magnetic elements in the accessory
case. The one or more magnetic elements can be located in
both the base and the lid of the accessory case. Another
example can further include a second alignment feature for
aligning to a second type of wireless charger. The second
alignment feature can include one or more magnetic ele-
ments in the accessory case.

20 Claims, 9 Drawing Sheets

(56) References Cited

U.S. PATENT DOCUMENTS

| | | | |
|---|---|---|---|
| 2012/0319647 A1* | 12/2012 | Itabashi ............ | H02M 3/33553 |
| | | | 320/108 |
| 2014/0253026 A1* | 9/2014 | Du ......................... | H02J 50/10 |
| | | | 320/108 |
| 2017/0063139 A1* | 3/2017 | Chang ..................... | H02J 50/12 |
| 2017/0094395 A1* | 3/2017 | McPeak ................. | A45C 11/24 |
| 2018/0115816 A1 | 4/2018 | Panecki et al. | |
| 2021/0273487 A1* | 9/2021 | Kovacs ................. | H02J 50/005 |
| 2022/0224167 A1* | 7/2022 | Jang ..................... | H01F 27/366 |

FOREIGN PATENT DOCUMENTS

| | | | |
|---|---|---|---|
| JP | 3177403 | U | 8/2012 |
| JP | 2013196883 | A | 9/2013 |
| JP | 2013201297 | A | 10/2013 |
| JP | 2018050365 | A | 3/2018 |
| JP | 2018110417 | A | 7/2018 |
| KR | 20160138909 | A | 12/2016 |
| KR | 20170039570 | A | 4/2017 |

OTHER PUBLICATIONS

Japanese Patent Application No. 2022-137034 , "Office Action", Oct. 2, 2023, 7 pages.
German patent application No. 102022208984.7, "Office Action", Mar. 7, 2025, 18 pages.
Indian Patent Application No. 202214049785, "First Examination Report", Dec. 4, 2025, 7 pages.
Korean Patent Application No. 10-2022-0109986, "Notice of Decision to Grant", Jan. 6, 2026.

* cited by examiner

ACCESSORY CASE FOR MULTIPLE CHARGER TYPES

CROSS-REFERENCE TO RELATED APPLICATIONS

This application claims the benefit of U.S. Provisional Application No. 63/243,584, filed on Sep. 13, 2021, which is incorporated by reference.

BACKGROUND

The number of types of portable electronic devices that are commercially available has increased tremendously the past few years and the rate of introduction of new devices shows no signs of abating. Portable devices, such as portable computing devices, tablets, laptops, smart phones, wearable computing devices, charging devices, storage devices, audio devices, portable media players, navigation systems, monitors, and others, have become ubiquitous.

Each of these portable devices can have an internal battery that allows users the freedom to carry the portable devices and use them wherever they go. Each of these portable devices can have their own unique way of being charged. For example, a first portable electronic device can be charged using a first type of wireless charger. This first type of wireless charger can include a first type of puck, where the first type of puck converts power received from a power adapter plugged into a wall outlet into wireless charging power. This wireless charging power can then be received by the first electronic device and used to charge a battery internal to the first electronic device.

Similarly, a second portable electronic device can be charged using a second type of wireless charger. This second type of wireless charger can include a second type of puck, where the second type of puck converts power received from a power adapter plugged into a wall outlet into wireless charging power. This wireless charging power can then be received by the second electronic device and used to charge a battery internal to the second electronic device.

As a result, a user wanting to be able to charge both the first portable electronic device and the second portable electronic device might need to own and carry both a first type of wireless charger and a second type of wireless charger. Accordingly, it can be desirable that the second portable electronic device be able to be charged using either the first wireless charger or the second wireless charger. This can be particularly true when the second portable electronic device is an accessory device that is used in conjunction with the first portable electronic device.

Thus, what is needed are accessory cases that can be charged using two or more types of wireless chargers.

SUMMARY

Accordingly, embodiments of the present invention can provide accessory cases that can be charged using two or more types of wireless chargers.

An illustrative embodiment of the present invention can provide an accessory case that can be charged using a first type of wireless charger as well as an additional type of wireless charger. The first type of wireless charger can be a magnetic charger. The additional type of wireless charger can be a non-magnetic charger. The accessory case can include one or more magnetic elements to act as an alignment feature. This alignment feature can help to align the accessory case to a wireless charger of the first type.

These and other embodiments of the present invention can provide an accessory case that can be charged using a first type of wireless charger, a second type of wireless charger, and the additional type of wireless charger. The first type of wireless charger can be a magnetic charger. The second type of wireless charger can be another magnetic charger. As before, the additional type of wireless charger can be a non-magnetic charger. The accessory case can include one or more magnetic elements to act as a first alignment feature. This first alignment feature can help to align the accessory case to a first type of wireless charger. The accessory case can include one or more magnetic elements to act as a second alignment feature. This second alignment feature can help to align the accessory case to a second type of wireless charger.

These and other embodiments of the present invention can provide an accessory case having a base. The base can have one, two, three, or more than three accessory receptacles, each for storing an accessory. Each accessory can be charged by the charging case when the accessory is stored in an accessory receptacle. A lid can cover the accessory receptacles in order to retain the accessories in place when the accessories are stored in the accessory case. A hinge can join the lid to the base such that the lid can move relative to the base to allow removal of the accessories from the accessory receptacles when the accessories are stored in the accessory case.

The first alignment feature can be a single magnetic element, where the magnetic element can be permanent or other type of magnet, an electromagnet, a ferromagnetic element, a pole piece and a magnet, or other magnetic element. The first alignment feature can be a plurality of magnetic elements, where each magnetic element can be permanent or other type of magnet, an electromagnet, a ferromagnetic element, a pole piece and a magnet, or other magnetic element. For example, the first alignment feature can be implemented as a first magnetic element in the base and a second magnet element in the lid. The first alignment feature can further include a third magnetic element in the base and a fourth magnetic element in the lid.

The second alignment feature can be a single magnetic element, where the magnetic element can be permanent or other type of magnet, an electromagnet, a ferromagnetic element, a pole piece and a magnet, or other magnetic element. The second alignment feature can be a plurality of magnetic elements, where each magnetic element can be permanent or other type of magnet, an electromagnet, a ferromagnetic element, a pole piece and a magnet, or other magnetic element. For example, the second alignment feature can be implemented as a first magnetic element in the base.

These and other embodiments of the present invention can provide an accessory case having a charging coil to receive power. Magnetic elements for the first alignment feature can be positioned around a center, where the center is at least a similar distance from each magnetic element. The magnetic elements can be placed in the base and the lid of the accessory case. The charging coil can have a center. The charging coil can be placed in the base such that is has clearance from the hinge. As a result, the center of the charging coil might not align with the center of the magnetic elements for the first alignment feature. When the accessory case is mated with a wireless charger of the first type, magnets in the wireless charger of the first type can align with the first alignment feature of the accessory case. Since a charging coil in the wireless charger of the first type is likely aligned with magnets in the wireless charger of the first type, the charging coil in the wireless charger of the first type might not align with the charging coil in the accessory case. Accordingly, the charging coil in the accessory case can be shaped and positioned to improve inductive coupling to the charging coil in the wireless charger of the first type. Additional shielding can be included to increase a coupling coefficient between the offset charging coil in the accessory case and the corresponding charging coil in the first type of wireless charger.

The second alignment feature can be located in a center of the charging coil of the accessory case. When the accessory case is mated with a wireless charger of the second type, a magnet in the wireless charger of the second type can align with the second alignment feature of the accessory case. Since a charging coil in the wireless charger of the second type is likely aligned with the magnet in the wireless charger of the second type, the charging coil in the wireless charger of the second type might align with the charging coil in the accessory case.

While embodiments of the present invention are well-suited to use in an accessory case, these and other embodiments of the present invention can be used in other types of electronic devices, such as portable computing devices, tablets, laptops, smart phones, wearable computing devices, charging devices, storage devices, audio devices, watches, jewelry, rings, portable media players, navigation systems, monitors, and others.

Various embodiments of the present invention can incorporate one or more of these and the other features described herein. A better understanding of the nature and advantages of the present invention can be gained by reference to the following detailed description and the accompanying drawings.

DESCRIPTION OF EXEMPLARY EMBODIMENTS

Figure 1:
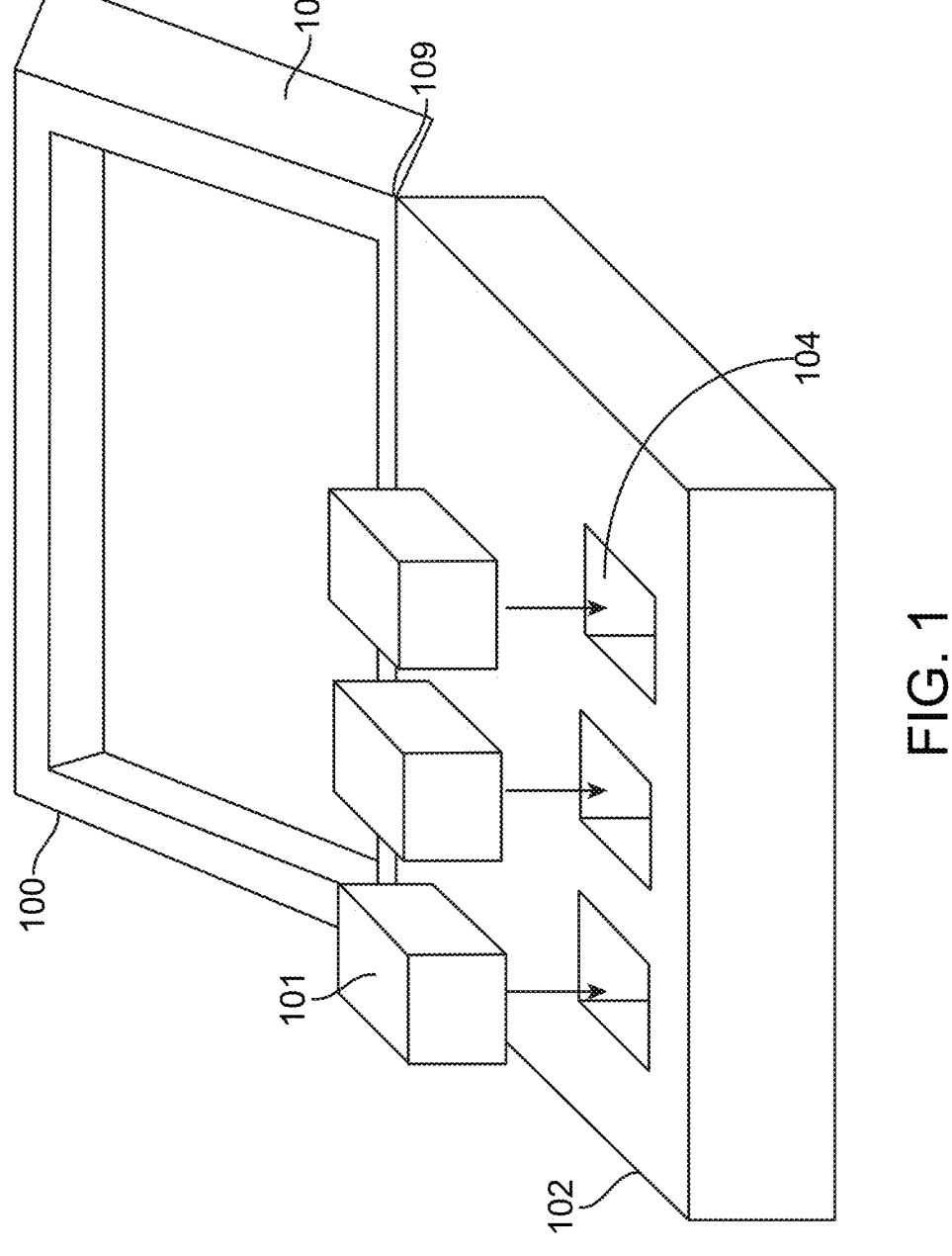
FIG. 1 illustrates an electronic device according to an embodiment of the present invention.

FIG. 1 illustrates an electronic device according to an embodiment of the present invention. This figure, as with the other included figures, is shown for illustrative purposes and does not limit either the possible embodiments of the present invention or the claims.

In this example, three accessories 101 can be stored for charging in accessory receptacles 104 in base 102 of accessory case 100. Accessory case 100 can include lid 108, which can be attached to base 102 using hinge 109. Lid 108 can be closed to retain accessories 101 in place when they are in accessory receptacles 104. Lid 108 can rotate along the axis of hinge 109 relative to base 102 to allow a user to remove accessories 101 from accessory receptacles 104.

Accessories 101 can communicate with accessory case 100 when stored in accessory receptacles 104 in base 102 of accessory case 100. In these and other embodiments of the present invention, accessories 101 can communicate with accessory case 100 when accessories 101 are not stored in accessory case 100. Also, in these and other embodiments of the present invention, accessories 101 can communicate with each other through accessory case 100 when stored in accessory receptacles 104 in base 102 of accessory case 100. In these and other embodiments, accessories 101 can communicate with each other when they are not stored in accessory case 100. These communications can be wired or wireless. For example, they can be Bluetooth or other wireless communications. Accessory case 100 can also provide charging power to one or more of the accessories 101 when one or more accessories are stored in accessory receptacles 104 in base 102 of accessory case 100.

In this example, charging and communication between accessories 101 and accessory case 100 can take place over the same contacts (not shown) on accessories 101. In these and other embodiments of the present invention, accessory case 100 can provide a charging voltage on a first contact and a reference ground on a second contact of an interface between accessory case 100 and accessory 101. Data can be transferred by modulating the charging voltage on the first pin. Accessory case 100 can modulate the charging voltage to send data to accessory 101 and accessory 101 can modulate the charging voltage itself to send data to accessory case 100.

In this example, three accessories 101 are shown, though in other embodiments, accessory case 100 can support one, two, or more than three accessories 101. Accessory case 100 can be a rectangular cuboid, it can be a rectangular-cuboid-type shape having rounded edges, or it can have another appropriate form factor. Accessories 101 can be rechargeable batteries, speakers, Bluetooth headphones, headsets, rings, bracelets, earbuds, wearable computing or media devices such as jewelry or watches, or other types of accessories.

Accessory case 100 can be powered by an internal battery (not shown), external power source (not shown), or other appropriate source or combination thereof. Accessory case 100 can provide power to and communicate with one or more accessories 101. These communications can include authentication and identification information, firmware and software updates, user provided preferences, or other information.

When accessory case 100 is charged, power can be provided by a battery controller (not shown) in accessory case 100 to an internal battery (not shown) in accessory case 100. In some circumstances, power can be provided directly to one or more accessories 101 that are stored in accessory receptacles 104 in base 102 of accessory case 100. In others, power can be provided to the battery, which can then provide power to one or more accessories 101. Power can be provided by the battery controller to one or more accessories 101 until they are acceptably charged, then power can be provided by to the internal battery, or other algorithms can be used.

The internal battery of accessory case 100 and one or more accessories 101 (collectively referred to here as accessory case 100 for simplicity) can be charged using a first type of wireless charger, where the wireless charger is magnetic. An example is shown in the following figure.

Figure 2:
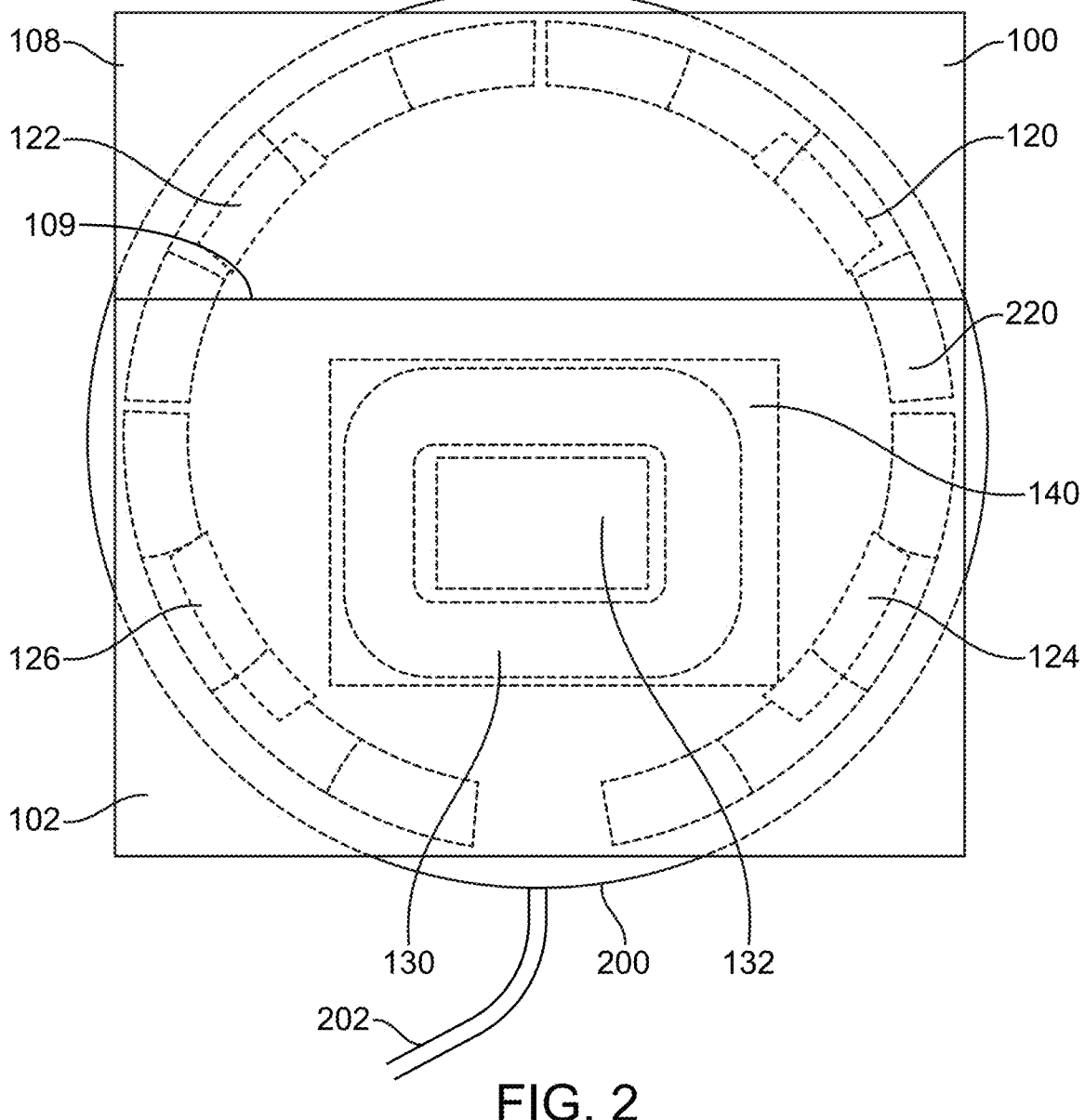
FIG. 2 illustrates an accessory case being charged by a first type of wireless charger according to an embodiment of the present invention.

FIG. 2 illustrates an accessory case being charged by a first type of wireless charger according to an embodiment of the present invention. Accessory case 100 can include lid 108 and base 102. Lid 108 can be attached to base 102 at hinge 109. One or more accessories 101 (shown in FIG. 1) can be stored in corresponding accessory receptacles 104 (shown in FIG. 2) in base 102. Lid 108 can close to help retain accessories 101 in place in accessory receptacles 104 in base 102. Lid 108 can open by rotating along an axis of hinge 109 relative to base 102. This can allow a user to remove one or more accessories 101 from accessory receptacles 104 in base 102.

In this example, accessory case 100 can be charged using charging puck 200 or other structure of a first type of charger. Charging puck 200 can receive power on cable 202. Control circuitry (not shown) in charging puck 200 can use this received power to generate currents in a charging coil (not shown.) These currents can generate a time varying magnetic field that can induce currents in charging coil 130. These induced currents can be used by a battery controller (not shown) and other control circuitry 320 (shown in FIG. 3) in accessory case 100 to provide power to an internal battery (not shown), one or more accessories 101 in accessory receptacles 104, or both.

Figure 4:
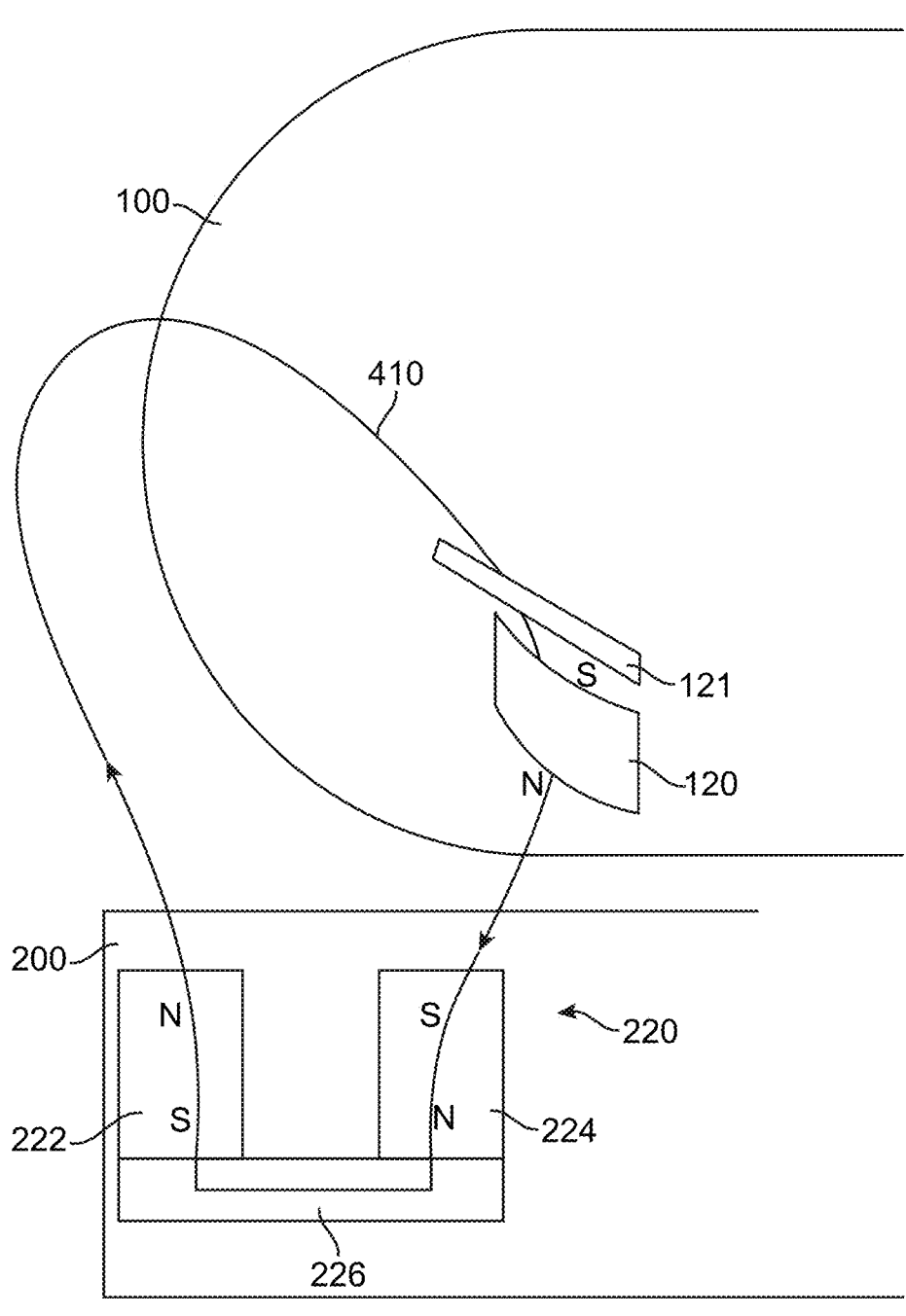
FIG. 4 illustrates an attraction of alignment magnets between an accessory case and a first type of charger according to an embodiment of the present invention.

Charging puck 200 can be magnetic. That is, charging puck 200 can include one or more magnetic elements that can be used by accessory case 100 to align accessory case 100 to charging puck 200. In this example, a ring of alignment magnets 220 can be included in charging puck 200. One or more magnetic elements, such as magnetic element 120, can be magnetically attracted to magnets in the ring of alignment magnets 220. In this example, magnetic element 120 and magnetic element 122 can be located in lid 108 of accessory case 100. Magnetic element 124 and magnetic element 126 can be located in base 102 of accessory case 100. Magnetic element 120, magnetic element 122, magnetic element 124, and magnetic element 126 can help to align accessory case 100 to charging puck 200. An example of how this is done is shown in FIG. 4.

In these and the other examples, magnetic element 120, and the other magnetic elements in accessory case 100, can be permanent magnets, rare earth magnets, pole pieces, ferromagnetic elements, or other magnetic elements.

In this example, charging coil 130 can have a central opening 132. A reset and pairing button 700 (shown in FIG. 7) for accessory case 100 can be located in central opening 132. Accessories 101 in accessory receptacles 104 and control circuitry 320 (shown in FIG. 3) can be shielded from charging coil by shield 140. Accessories 101 and control circuitry 320 can be shielded from magnetic element 120, magnetic element 122, magnetic element 124, and magnetic element 126 by corresponding shields 121 (shown in FIG. 4.)

In these and other embodiments of the present invention, accessory case 100 can be charged using a wired connection. Accessory case 100 can include a connector receptacle, such as a Lightning™ or Universal Serial Bus (USB) Type-C connector receptacle. This connector receptacle can accept a corresponding connector insert and power can be provided through this connection to a battery internal to accessory case 100, one or more accessories 101 stored in accessory receptacles 104 in accessory case 100, or both.

As shown in this example, charging coil 130 might not be centered between magnetic element 120, magnetic element 122, magnetic element 124, and magnetic element 126 of accessory case 100. That is, charging coil 130 might be offset from a center of these magnetic elements. This offset can be caused by the position of hinge 190, as charging coil 130 might need to be positioned clear of hinge 190. Typically, a charging coil (not shown) in charging puck 200 can be centered relative to ring of alignment magnets 220. Accordingly, charging coil 300 in accessory case 100 might not be centered with a charging coil in charging puck 200. Accordingly, charging coil 130 can be positioned and shaped and additional features can be added to improve inductive coupling between charging coil 130 in accessory case 100 and a charging coil in charging puck 200 to help overcome this offset. Further details regarding charging coil 130 and related structures are shown in the following figure.

Figure 3:
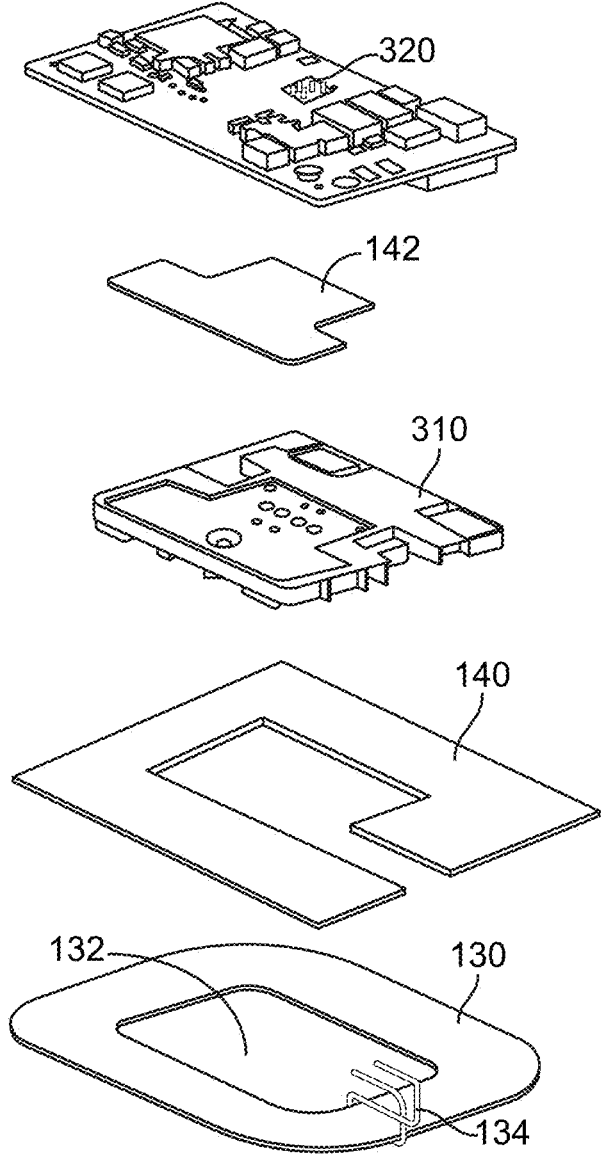
FIG. 3 illustrates charging and control components for an accessory case according to an embodiment of the present invention.

FIG. 3 illustrates charging and control components for an accessory case according to an embodiment of the present invention. In this example, a magnetic field generated by charging puck 200 (shown in FIG. 2), can induce currents in charging coil 130. These currents can be provided on wires 134 to control circuitry 320. Control circuitry 320 can include a battery controller (not shown) and other circuits. Control circuitry 320 can use the induced currents received at charging coil 130 to charge an internal battery (not shown) of accessory case 100 (shown in FIG. 2), one or more accessories 101 stored in accessory receptacles 104 in base 102 of accessory case 100 (all shown in FIG. 1), or both.

Control circuitry 320 can be shielded from charging coil 130 by shield 140, which can be positioned between charging coil 130 and control circuitry 320. Control circuitry 320 can be further shielded from charging coil 130 by shield 142, which can be positioned between button housing 310 and control circuitry 320. Shield 140 and shield 142 can act as magnetic shunts and can shield control circuitry 320 to prevent eddy currents from being induced by currents in charging coil 130. Shield 140 and shield 142 can also improve a coupling coefficient between charging coil 130 and a corresponding coil in charging puck 200 (shown in FIG. 2) or other charger. This increase in coupling coefficient can help to compensate for the offset in the position of charging coil 130 relative to the first alignment features including magnetic element 120, magnetic element 122, magnetic element 124, and magnetic element 126 in accessory case 100 (all shown in FIG. 2.) Shield 140 and shield 142 can be formed of a magnetically permeable material, such as a ferrite or other material. For example, shield 140 and shield 142 can be formed of laminated layers of a nanocrystalline material. The nanocrystalline material can be an amorphous ferritic material or other material.

Button housing 310 can be positioned in central opening 132 of charging coil 130. Button housing 310 can include button 700 (shown in FIG. 7) that can be actuated by a user. Button 700 can control a reset function for control circuitry 320. Button 700 can also be used to initiate pairing between one or more accessories 101 (shown in FIG. 1) and accessory case 100.

FIG. 4 illustrates an attraction of alignment magnets between an accessory case and a first type of charger according to an embodiment of the present invention. In this example, accessory case 100 can be aligned with charging puck 200. Charging puck 200 can include a ring of alignment magnets 220. Ring of alignment magnets 220 can include outer magnet 222, inner magnet 224, and backplate 226. Field line 410 can emerge from north pole of outer magnet 222 and can arrive at shield 121. Field line 410 can continue through shield 121 to the south pole of magnetic element 120. Field line 410 can continue from the north pole of magnetic element 120 to south pole of inner magnet 224. Field line 410 can continue through backplate 226 from the north pole of inner magnet 224 to the south pole of outer magnet 222. In this way, field line 410 can create magnetic attraction between magnetic element 120 in accessory case 100 and ring of alignment magnets 220 in charging puck 200. This attraction can be primarily between magnetic element 120 and inner magnet 224 of ring of alignment magnets 220. This attraction, when combined with similar magnetic attractions between magnetic element 122 and ring of alignment magnets 220, magnetic element 124 and ring of alignment magnets 220, and magnetic element 126 and ring of alignment magnets 220, can align accessory case 100 with charging puck 200. This can allow charging puck 200 to charge accessory case 100.

These and other embodiments of the present invention can also be charged by a second type of wireless charger. An example is shown in the following figure.

Figure 5:
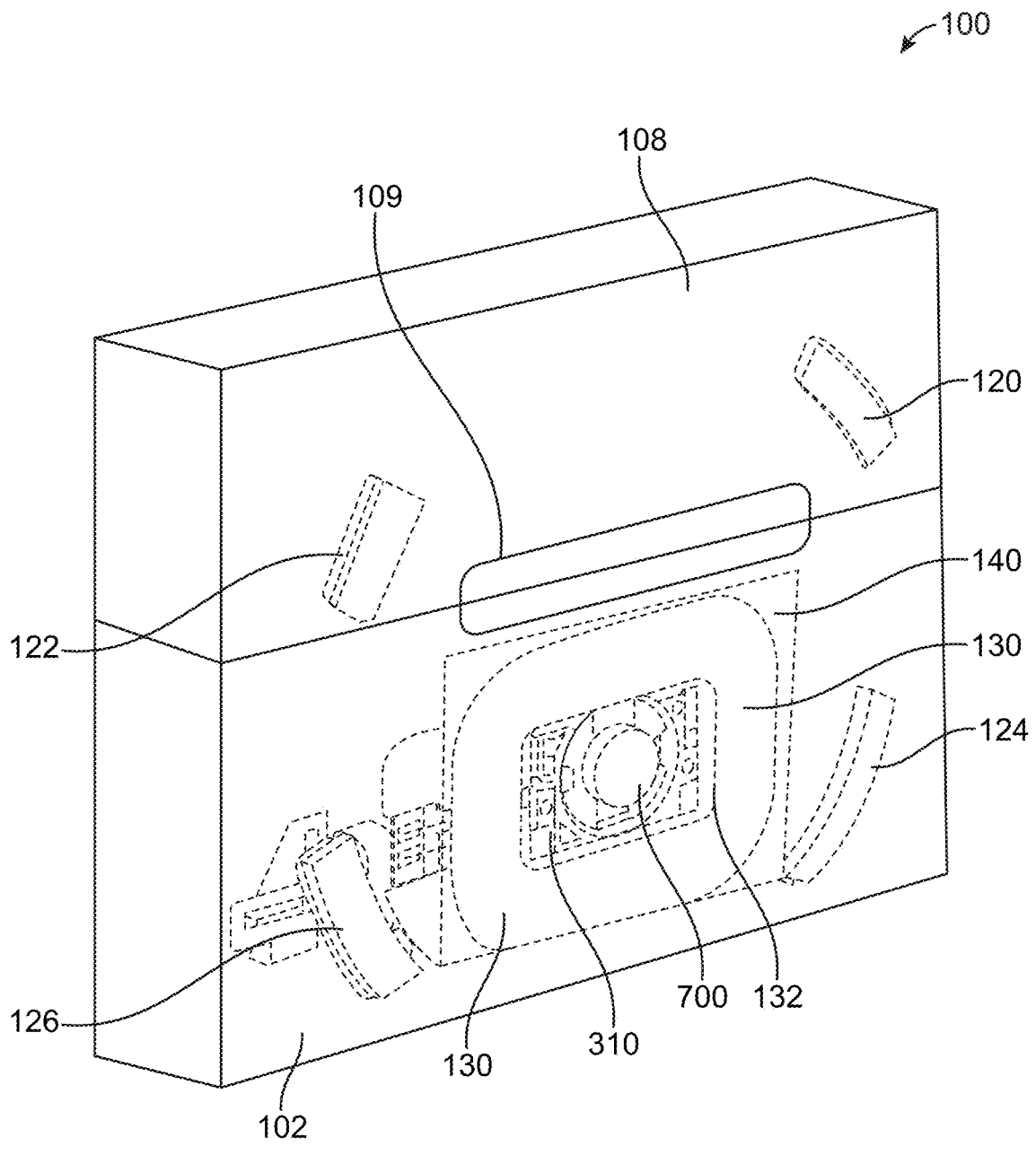
FIG. 5 illustrates an accessory case according to an embodiment of the present invention.

FIG. 5 illustrates an accessory case according to an embodiment of the present invention. Accessory case 100 can include base 102 having one or more accessory receptacles 104 (shown in FIG. 1) for storing one or more accessories 101 (shown in FIG. 1.) Base 102 can be attached to lid 108 through hinge 109. Lid 108 can help to retain accessories 101 in their accessory receptacles 104. Lid 108 can rotate through an axis of hinge 109 relative to base 102. This can allow accessory case 100 to be opened such that a user can extract the one or more accessories 101 from their accessory receptacles 104 in base 102.

As before, magnetic element 120 and magnetic element 122 can be positioned in lid 108 of accessory case 100. Magnetic element 124 and magnetic element 126 can be located in base 102. Magnetic element 120, magnetic element 122, magnetic element 124, and magnetic element 126, can help to align accessory case 100 to a first type of wireless charger as shown in FIG. 2.

Button housing 310 can be located in central opening 132 of charging coil 130. Button housing 310 can include button 700. A user can actuate button 700 to reset control circuitry 320 (shown in FIG. 3.) A user can actuate button 700 to initiate a pairing between accessory case 100 and one or more accessories 101.

In these and other embodiments of the present invention, button 700 can be magnetic. For example, a portion of button 700 can be formed of a magnetic element 510 (shown in FIG. 7), where the magnetic element 510 can be a permanent magnet, electromagnet, pole piece, ferromagnetic element, or other magnetic element. A north pole of magnetic element 510 can face out the backside (the side illustrated here) of accessory case 100. Alternatively, a south pole of the magnetic element can face out the illustrated backside of accessory case 100. In this way, magnet element 510 can be laterally surrounded by charging coil 130. Charging coil 130 can be shielded by shield 140. In this configuration, magnetic element 510 can align with a corresponding magnet in a second type of wireless charger. Charging coil 130 can align with a corresponding coil hat is positioned laterally around the corresponding magnet in a puck or other structure of the second type of wireless charger. Charging coil 130 can receive a modulated magnetic flux from the second type of wireless charger. Currents generated in charging coil 130 from this modulated magnetic flux can be used by a control circuitry 320 (shown in FIG. 3) to charge a battery (not shown) internal to accessory case 100, one or more accessories 101 stored in accessory receptacles 104 in accessory case 100, or both.

In these and other embodiments of the present invention, accessory case 100 can be charged using a wired connection. Accessory case 100 can include a connector receptacle, such as a Lightning™ or Universal Serial Bus (USB) Type-C connector receptacle. This connector receptacle can accept a corresponding connector insert and power can be provided through this connection to a battery internal to accessory case 100, one or more accessories 101 stored in accessory receptacles 104 in accessory case 100, or both.

Figure 6:
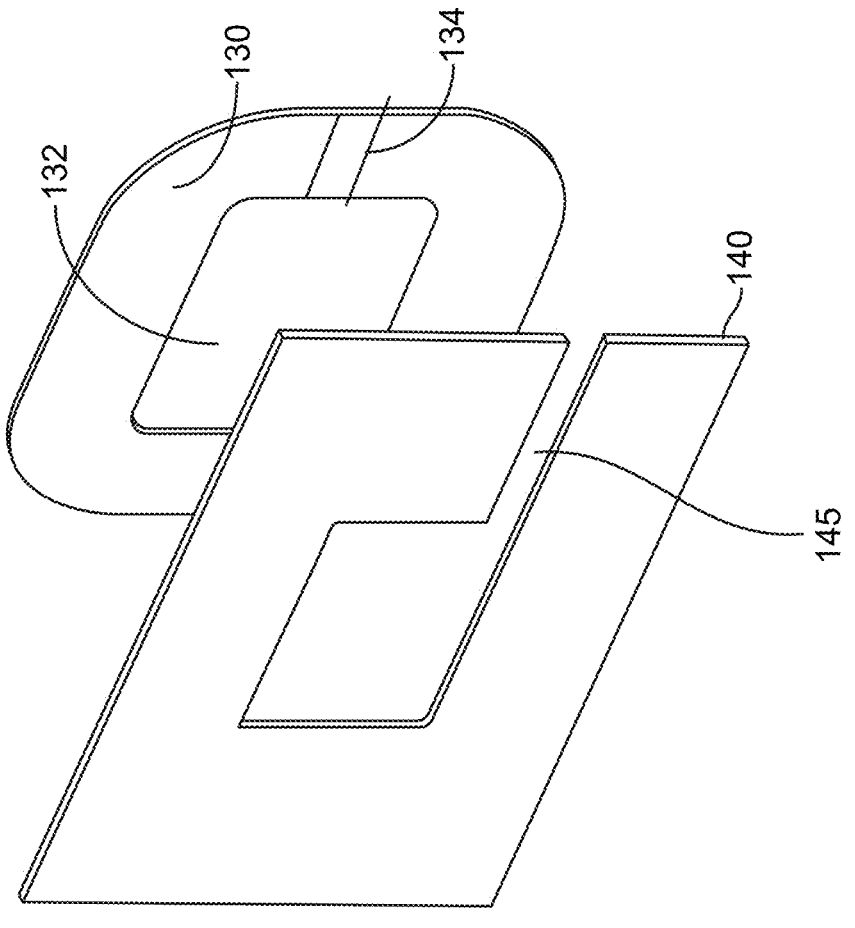
FIG. 6 illustrates a portion of an accessory case according to an embodiment of the present invention.
Figure 6:
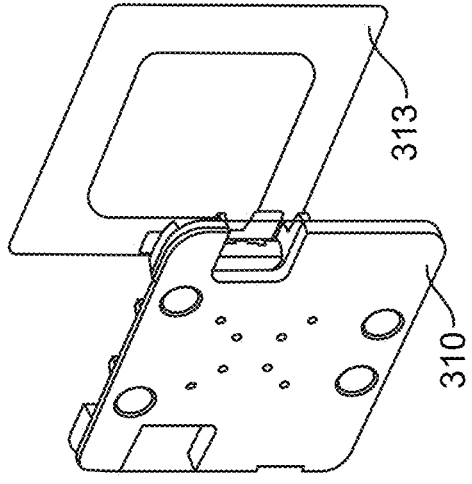

FIG. 6 illustrates a portion of an accessory case according to an embodiment of the present invention. In this example, button housing 310 can be attached to a backside of shield 140 by adhesive layer 313. Adhesive layer 313 can be a pressure-sensitive adhesive layer, a heat-activated film layer, an ultra-violet cured adhesive, a polyimide film, or other adhesive layer. Button housing 310 can be positioned in a central opening 132 of charging coil 130. Wires 134 from charging coil 130 can be routed through slot 145 in shield 140 to control circuitry 320 (shown in FIG. 3.) Slot 145 can help to prevent eddy currents from forming in shield 140.

In these and other embodiments of the present invention, a flexible circuit board can connect button housing 310 to control circuitry 320 (shown in FIG. 3.) Additional circuitry, such as overheating protection or thermal shutdown, can be included.

Figure 7:
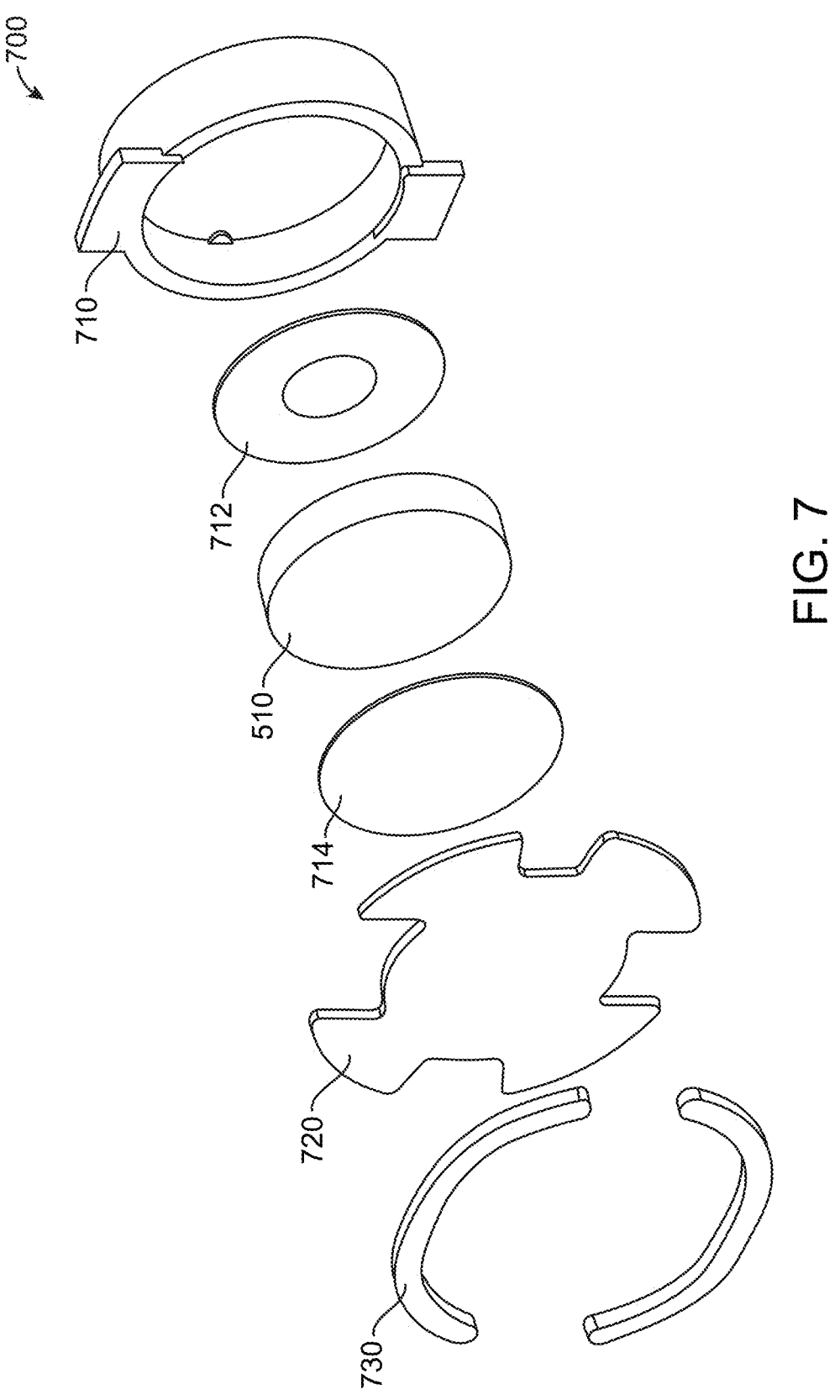
FIG. 7 illustrates details of a button that can be used in aligning a second type of wireless charger to an accessory case according to an embodiment of the present invention.

FIG. 7 illustrates details of a button that can be used in aligning a second type of wireless charger to an accessory case according to an embodiment of the present invention. In this example, button 700 can include magnetic element 510. Magnet element 510 can be attached to in inside surface of bucket 710 using first adhesive layer 712. Magnetic element 510 can be attached to shield 720 using second adhesive layer 714. First adhesive layer 712 and second adhesive layer 714 can be a pressure-sensitive adhesive layer, a heat-activated film layer, an ultra-violet cured adhesive, a polyimide film, or other adhesive layer. Foam 730 can be positioned between shield 720 and button housing 310 and between bucket 710 and button housing 310.

Shield 720 can act as a magnetic shunt and can shield control circuitry 320 from magnetic element 510. Shield 720 can also improve a coupling coefficient between magnetic element 510 and a corresponding magnet in a second type of wireless charger. Shield 720 can be formed of a magnetically permeable material, for example a ferrite or other material. For example, shield 720 can be formed of laminated layers of a nanocrystalline material. The nanocrystalline material can be an amorphous ferritic material or other material.

In this example, bucket 710 can be formed of plastic or resin to match the remaining portion of an enclosure 810 (shown in FIG. 8) for accessory case 100. A back side of bucket 710 can be flush with enclosure 810 for accessory case 100. Magnetic element 510 can be a permanent magnet, and electromagnet, a ferromagnetic element, pole piece, or other magnetic element.

Figure 8:
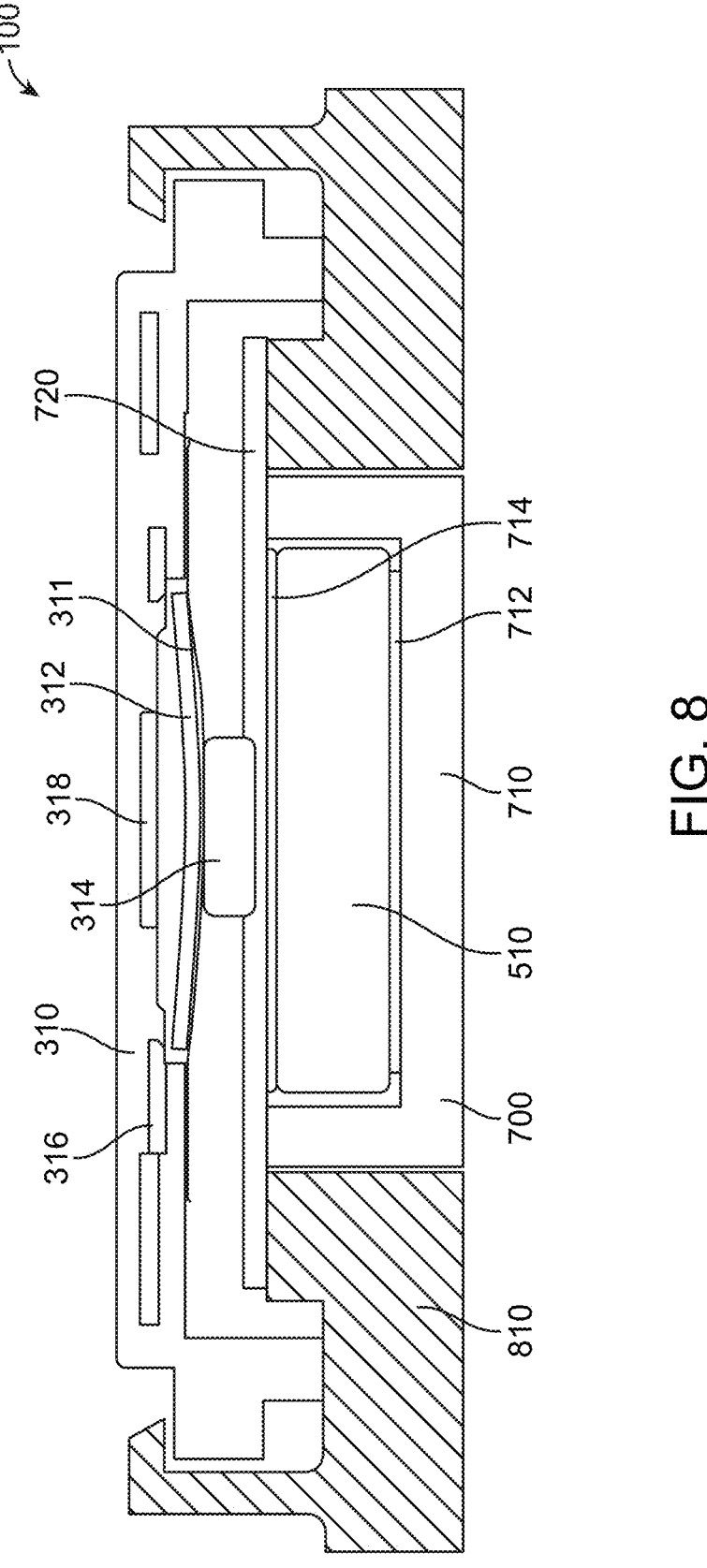
FIG. 8 is a side view of a button and related structures that can be used in aligning a second type of wireless charger to an accessory case according to an embodiment of the present invention.

FIG. 8 is a side view of a button and related structures that can be used in aligning a second type of wireless charger to an accessory case according to an embodiment of the present invention. In this example, button 700 can include magnetic element 510, which can be attached to bucket 710 by first adhesive layer 712. Magnetic element 510 can also be attached to shield 720 by second adhesive layer 714. When actuated by a user, button 700 can move upward as shown relative to enclosure 810 of accessory case 100. This movement can drive pusher 314 of button housing 310 into flexible dome 312. Flexible dome 312 can be conductive or can have a conductive surface. When flexible dome 312 is sufficiently vertically displaced, flexible dome 312 can form an electrical connection between contact 318 and contact 316. This connection can be detected by control circuitry 320 (shown in FIG. 3.) Flexible dome 312 can be held in place and sealed using flexible coverlay 311. Flexible dome 312 can be implemented as one, two, or more than two flexible domes 312 to give a desired force profile.

In these and other bottoms of the present invention, accessory case 100 can be charged using two or more types of wireless chargers. These two chargers can operate at different frequencies. As such, control circuitry 320 can employ two charging circuits, each tuned to a different frequency, for receiving power from these different wireless chargers. Alternatively, a single charging circuit that can be tuned between two frequencies can be employed. An example is shown in the following figure.

Figure 9:
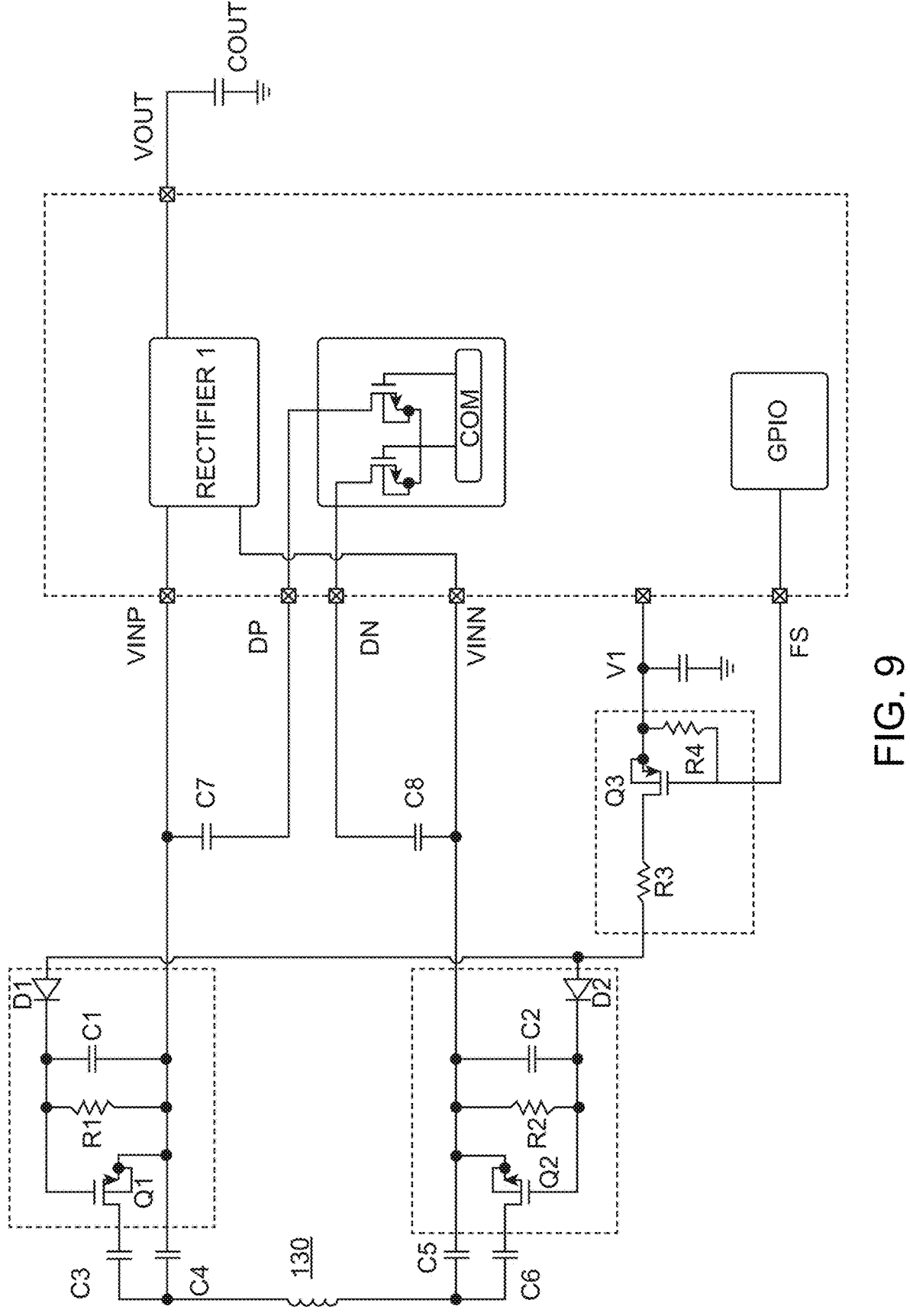
FIG. 9 illustrates a charging circuit that can be used with wireless chargers operating at multiple frequencies.

FIG. 9 illustrates a charging circuit that can be used with wireless chargers operating at multiple frequencies. In a first state, frequently select output FS from general-purpose input output (GPIO) circuit can be high. A source of transistor Q3 can be connected to a low dropout regulated voltage V1. As a result, transistor Q3 can be off. Transistor Q1 can be turned off by resistor R1 connected between the gate and source of transistor Q1. Similarly, transistor Q2 can be turned off by resistor R2 connected between the gain and source of transistor Q2. Charging coil 130 can then form a resonant circuit with capacitor C4 and capacitor C5. The frequency peak of this resident circuit can be tuned to operate at a frequency of one of the wireless chargers.

In a second state, frequency select output FS from the GPIO circuit can be low. This can turn on transistor Q3, which can in turn pull-up on the gate of transistor Q1 through diode D1 and the gate of transistor Q2 through diode D2. Transistor Q1 can connect capacitor C3 across capacitor C4. Transistor Q2 can connect capacitor C6 across capacitor C5. Charging coil 130 can then form a resonant circuit with the parallel combination of capacitor C3 and capacitor C4 and the parallel combination of capacitor C5 and capacitor C6. This new lower-frequency resonant circuit can be tuned to operate at a frequency of one of the wireless chargers.

Currents induced in charging coil 130 can generate a voltage at the inputs VINP and VINN of the rectifier circuit RECTIFIER 1. The rectifier circuit RECTIFIER 1 can rectify this waveform and provide an output voltage VOUT at capacitor COUT. The output voltage can be used to charge a battery (not shown) internal to accessory case 100, one or more accessories 101 stored in accessory receptacles 104 in accessory case 100 (all shown in FIG. 1), or both.

In these and other bottoms of the present invention, it can be desirable for accessory case 100 to be able to send data to a wireless charger. For example, this data can inform the wireless charger that accessory case 100 is a valid device that needs to be charged. Accordingly, communications circuit COM can provide output signals DP and DN through capacitors C7 and C8 to charging coil 130. This output signal can be received through a charging coil in a wireless charger.

Variations on this circuit can be used in these and other embodiments of the present invention. For example, transistor Q2 and its related circuitry can be removed. The lower terminal of charging coil 130 can be grounded. Adjustments can be made to the sizes of capacitor C3 and capacitor C4 to compensate for the removal of capacitor C5 capacitor C6. In still other embodiments of the present invention, additional capacitor and transistor pairs can be placed in parallel with capacitor C3 transistor Q1, as well as capacitor C6 and transistor Q2. These additional transistors can be driven by an additional logic output from the GPIO circuit. The inclusion of these additional transistors and capacitors can provide additional possible states for the illustrated circuitry and can allow compatibility with additional wireless chargers.

While embodiments of the present invention are well-suited to use in an accessory case, these and other embodiments of the present invention can be used in other types of electronic devices, such as portable computing devices, tablets, laptops, smart phones, wearable computing devices, charging devices, storage devices, audio devices, watches, jewelry, rings, portable media players, navigation systems, monitors, and others.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A charging case comprising:
   a base, the base having a plurality of accessory receptacles for storing a corresponding plurality of accessories, where the accessories are chargeable by charging components in the charging case when the accessories are stored in the accessory receptacles;
   a lid, the lid covering the accessory receptacles for retaining the accessories when the accessories are stored in the accessory receptacles;
   a hinge joining the lid to the base such that the lid is movable relative to the base to allow removal of the accessories from the accessory receptacles when the accessories are stored in the accessory receptacles;
   a first alignment feature comprising a plurality of magnets for aligning the charging case to a first type of charger, the first alignment feature comprising a first magnet and a second magnet in the base and a third magnet and a fourth magnet in the lid;
   a second alignment feature consisting of a single magnet for aligning the charging case to a second type of charger, the second alignment feature comprising a fifth magnet aligned with a center of a charging coil; and
   the charging components comprising the charging coil to wirelessly receive power from the first type of charger or from the second type of charger and to provide the received power to the accessories when the accessories are being charged in the accessory receptacles.

2. The charging case of claim 1 wherein the first type of charger is a first type of wireless charger and the second type of charger is a second type of wireless charger.

3. The charging case of claim 2 further comprising a connector receptacle to accept a compatible connector insert and to receive power through the connector insert and to provide power to the accessories when the accessories are stored in the accessory receptacles.

4. The charging case of claim 3 wherein the charging components comprise the charging coil and a shield.

5. The charging case of claim 4 wherein the charging coil is offset relative to a center of the first alignment feature and the charging coil is centered relative to a center of the second alignment feature.

6. The charging case of claim 1 wherein the first alignment feature and the second alignment feature are permanent magnets.

7. The charging case of claim 1 wherein the plurality of accessories comprises earbuds.

8. A charging case comprising:

a base, the base having an accessory receptacle for storing an accessory, where the accessory is chargeable by charging components in the charging case when the accessory is stored in the accessory receptacle;

a lid, the lid covering the accessory receptacle for retaining the accessory when the accessory is stored in the accessory receptacle;

a hinge joining the lid to the base such that the lid is movable relative to the base to allow removal of the accessory from the accessory receptacle when the accessory is stored in the accessory receptacle;

a first alignment feature for aligning the charging case to a first type of charger, wherein the first alignment feature comprises a first magnetic element and a second magnetic element in the base, and a third magnetic element and a fourth magnetic element in the lid;

a second alignment feature for aligning the charging case to a second type of charger; and the charging components to wirelessly receive power from the first type of charger or from the second type of charger and to provide the received power to the accessory when the accessory is stored in the accessory receptacle, and wherein the second alignment feature comprises a fifth magnet in a center of a charging coil.

9. The charging case of claim 8 wherein the first alignment feature and the second alignment feature are permanent magnets.

10. The charging case of claim 8 wherein the accessory comprises a wearable computing device.

11. A charging case comprising:

a base to store an accessory, where the accessory is chargeable by charging components in the charging case when the accessory is stored in the base;

a lid to retain the accessory when the accessory is stored in the base;

a hinge joining the lid to the base such that the lid is rotatable around the hinge to allow removal of the accessory from the base;

a first plurality of magnetic elements for magnetically aligning the charging case to a first type of charger, wherein the first plurality of magnetic elements comprises a first magnet and a second magnet in the base and a third magnet and a fourth magnet in the lid;

a second magnet element for magnetically aligning the charging case to a second type of charger, wherein the second magnet element comprises a fifth magnet positioned in the center of a charging coil; and the charging components comprising the charging coil, wherein the charging components are capable of receiving power from the first type of charger that provides a charging waveform having a first frequency when a charger of the first type of charger is aligned to the charging case and capable of receiving power from the second type of charger that provides a charging waveform having a second frequency when a charger of the second type of charger is aligned to the charging case.

12. The charging case of claim 11 wherein the first type of charger is a first type of wireless charger and the second type of charger is a second type of wireless charger.

13. The charging case of claim 12 further comprising a connector receptacle to accept a compatible connector insert and to receive power through the connector insert and to provide power to the accessory when the accessory is stored in the base.

14. The charging case of claim 13 wherein the charging coil is in the base and the charging components further comprise a shield.

15. The charging case of claim 14 wherein the charging coil is offset relative to a center of the first plurality of magnet elements and the charging coil is centered relative to a center of the second magnetic element.

16. The charging case of claim 15 wherein the first plurality of magnetic elements and the second magnet element are permanent magnets.

17. The charging case of claim 11 wherein the charging components comprise:

the charging coil; and a variable capacitor coupled to the charging coil, wherein the variable capacitor is selected to have a first capacitance when the charging components receive power from the first type of charger and the variable capacitor is selected to have a second capacitance when the charging components receive power from the second type of charger.

18. The charging case of claim 17 wherein the variable capacitor comprises:

a first capacitor having a first terminal coupled to a first terminal of the charging coil;

a second capacitor having a first terminal coupled to the first terminal of the charging coil;

a third capacitor having a first terminal coupled to a second terminal of the charging coil;

a fourth capacitor having a first terminal coupled to the second terminal of the charging coil;

a first switch having a first terminal coupled to a second terminal of the first capacitor and a second terminal coupled to a second terminal of the second capacitor; and a second switch having a first terminal coupled to a second terminal of the third capacitor and a second terminal coupled to a second terminal of the fourth capacitor.

19. The charging case of claim 18 wherein the charging components further comprise a rectifier having a first input coupled to the second terminal of the first capacitor and the first terminal of the first switch, and a second input coupled to the second terminal of the third capacitor and the first terminal of the second switch.

20. The charging case of claim 19 further comprising communication circuitry to provide data using the charging coil, the communication circuit having a first output coupled to the second terminal of the first capacitor and the first terminal of the first switch, and a second output coupled to the second terminal of the third capacitor and the first terminal of the second switch.

* * * * *